Aug. 21, 1951
A. E. BRATT
2,564,670
PRESS FITTED JOINT AND MEANS FOR SEPARATING
THE MEMBERS THEREOF
Filed June 29, 1943
2 Sheets-Sheet 1
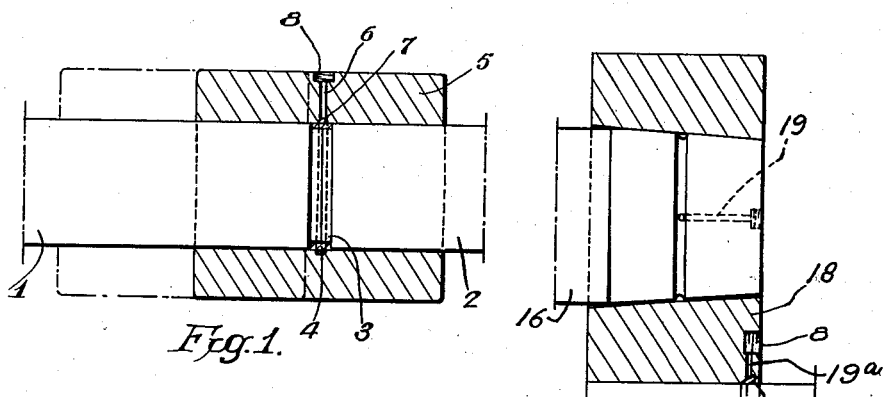
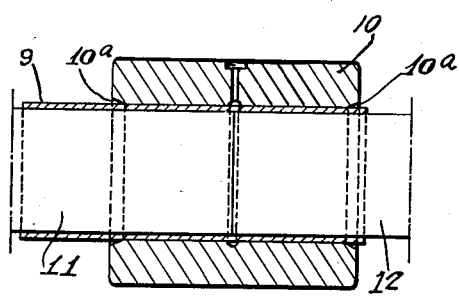
Fig.2.
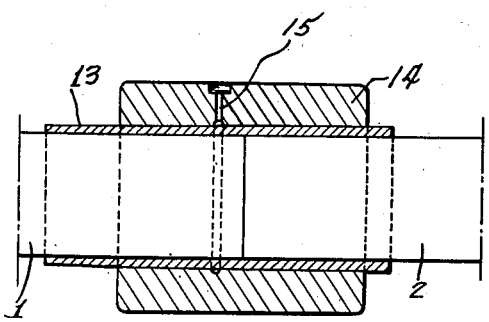
Fig.3.
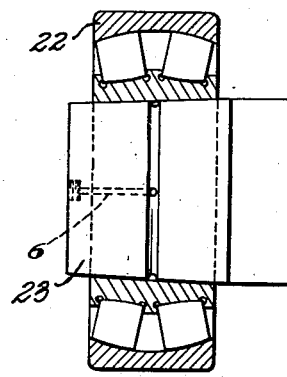
Fig.4.
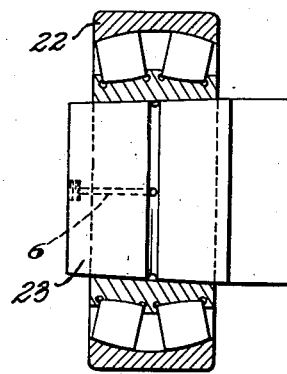
Fig.5.
Inventor:—
Axel Erland Bratt
by his Attorneys
Howson + Howson

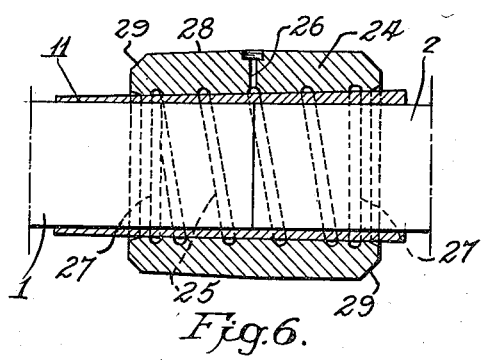
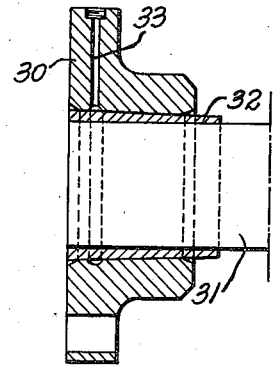
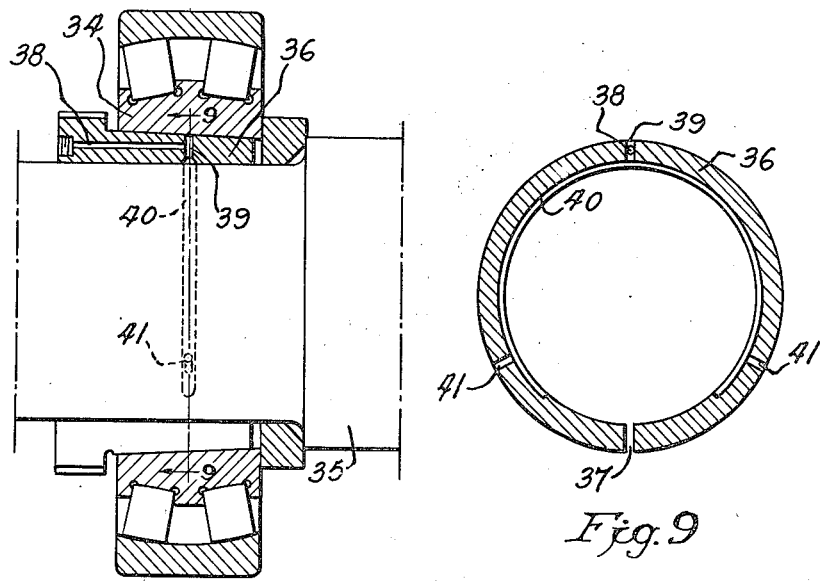

Patented Aug. 21, 1951

2,564,670

UNITED STATES PATENT OFFICE 2,564,670

PRESS FITTED JOINT AND MEANS FOR SEPARATING THE MEMBERS THEREOF

Axel Erland Bratt, Goteborg, Sweden, assignor to SKF Industries Inc., Philadelphia, Pa., a corporation of Delaware Application June 29, 1943, Serial No. 492,762 In Sweden December 31, 1942

6 Claims. (Cl. 285—193)

The present invention relates to a press fitted or shrunk joint and has for its purpose to facilitate the making of the joint or the separation thereof. Hitherto the assembling and especially the separation of such joints has met with considerable difficulty as they have usually been made by shrinking one of the parts onto the other and it has been found difficult to attain the necessary difference in temperature between the parts in order to loosen the joint. Alternatively it is difficult to obtain the necessary forces for displacing the members of the joint relative each other. According to the present invention arrangements are made for introducing a pressure medium such as a fluid, a gas, or the like between the engaging surfaces so that the metallic contact is relieved over at least the greater part of the surfaces whereby these may be more easily displaced relative each other.

Several embodiments of the invention are illustrated in the accompanying drawings on which Fig. 1 shows an axial section of an embodiment of the invention as applied to a coupling for connecting two shaft ends.

Fig. 2 shows another embodiment of a similar coupling, and

Fig. 3 shows a third form in which the engaging surfaces are tapered.

Fig. 4 shows the invention as applied to a built-up crank shaft and

Fig. 5 shows the invention as used for seating and unseating a ball or roller bearing.

Fig. 6 shows a modification of the embodiment shown in Fig. 3.

Fig. 7 shows the invention applied to a dismountable coupling flange.

Fig. 8 shows the invention applied for fixing a roller bearing on a shaft by means of a tapered sleeve and Fig. 9 shows a section through the sleeve along the line IX—IX in Fig. 8.

Fig. 1 shows a coupling for connecting two shaft ends 1 and 2. The shaft ends are turned down to a smaller diameter as at 3, and upon the seat thus formed is pressed a sealing ring 4, the purpose of which will be apparent from the following. For the purpose of illustration the ring is shown as being broader and thicker than in reality. A coupling sleeve 5 is mounted on the shaft ends and its inner diameter is such relative to the shaft diameter that a heavy press fit is obtained between the sleeve 5 and the shaft ends. The sleeve 5 is provided with a channel 6, which preferably opens into a groove 7 (also enlarged in the drawing) extending around the inner periphery of the sleeve. The channel 6 is provided at its outer end with a thread 8 or other suitable arrangement for connecting to a conduit for a suitable pressure medium, for example oil.

The sleeve 5 may be located on one of the shaft ends in any suitable or known manner, for example by heating it and thereafter allowing it to cool on the shaft as shown by dot and dash lines in Fig. 1. The shaft ends are now brought into abutment and the ring 4 pressed on to the seat 3. The coupling sleeve 5 is then displaced axially by means of a suitable tool, and by making use of the invention in the following manner. The connection 8 is connected to a conduit for a pressure medium for example oil having a pressure at least as great as the specific pressure between the engaging coupling surfaces. The oil forces its way between the surfaces of the coupling sleeve and the shaft ends and forms a film which makes it possible to displace the sleeve axially along the shaft by means of a force which can be attained without difficulty and without damaging the contact surfaces. The oil film may be so thin that it relieves the metallic contact between the surfaces but does not materially expand or contract the engaging parts. The oil pressure forces the relatively thin sealing ring 4 against the seat 3 and thus prevents oil from squeezing in between the shaft ends and exerting a separating force against them. Otherwise there would be a tendency for the pressure against the ends of the shaft to separate the shaft ends when the coupling sleeve is being forced over into place. It may also be desirable to prevent the oil from exerting pressure on the ends of the shaft when separating the parts either for the reason that space may not permit an axial displacement of the shaft or for the reason that the contacting surfaces may be damaged if the shafts are separated while there is still direct metallic contact between the engaging coupling surfaces.

The channel 6 is preferably located at about the center of the sleeve 5 so that the pressure fluid will be evenly distributed toward both sides.

Fig. 2 shows a device which corresponds to that shown in Fig. 1 with the exception that a sleeve 9 is provided between the coupling sleeve 10 and the shafts 11 and 12. The inner diameter of the sleeve is such that it will easily slide on the shafts when free, but the sleeve is so thin that it is easily contracted by the coupling sleeve 10 and thereby connects the shafts. The sleeve 9 effectively replaces the ring 4 shown in Fig. 1. It can be used in such cases where for some reason or other it is not desired to permit the coupling sleeve 10 directly to engage the shaft, for instance in cases where the material of the shaft or the finish of the surfaces is unsuitable. The sleeve 9 should be long enough to extend a distance from the joint about as long as the length of the sleeve 10.

The coupling sleeve 10 in Fig. 2 is provided with bevels 10a at the ends of the inner surface. The contacting surface of the sleeve 10 will therefore terminate some distance from the end of the sleeve. The specific pressure at the end of contacting surface will therefore be somewhat greater than along the intermediate part of the contacting surface. This greater specific pressure at the ends of the contacting surfaces is due to the mass of material of the sleeve 10 between the inner edges of the bevels 10a and the adjacent outer ends of the said sleeve, which mass of material, because of the bevels, is not subjected to the direct radial or expansive force of the pressure fluid. In other words, there is a greater resistance to outward expansion of the sleeve at the ends thereof beyond the inner edges of the bevels than there is along the intermediate portion of the contacting surfaces. By virtue of this construction, the pressure fluid will have to expand not only the material of the sleeve which is in the radial planes containing the inner edges of the bevels 10a, but will also have to expand all of the mass of material which is located beyond the inner edges of said bevels and the adjacent ends of said sleeve, it being obvious that at the ends of the sleeve there is more material for the pressure fluid to expand than there is at any point of the contacting surfaces. This construction makes it possible to utilize considerably higher fluid pressures for separating the members of the joint or coupling without excessive leakage at the ends of the sleeve. It will thus be possible to force fluid between the surfaces over the greater portion of the contacting surfaces without causing any considerable leakage of fluid at the ends of the sleeve.

Fig. 3 shows still another form of the invention in which the sleeve 9 has been replaced by a sleeve 13 having an externally tapering surface. The coupling sleeve 14 has an internal tapering surface, which fits the tapering surface on the sleeve 13. This form of the invention has the advantage that the coupling sleeve 14 will be entirely disconnected through only a relatively short axial displacement. Further the sleeve can be mounted by making use of the invention from the beginning and consequently no heating will be required. In a joint having a tapering sleeve the surface pressure at the end having the smallest hole diameter will be greater than at the other end. In order to compensate for this and to prevent the pressure medium from leaking out at the larger end before the fluid has been distributed over the whole surface near the smaller end, the channel 15 may be suitably located somewhat closer to the smaller end of the sleeve 14. A corresponding result may instead be obtained by varying in a suitable manner the thickness of the sleeve along its length. The taper can be so chosen that the sleeve may be separated only by introducing pressure oil between the contacting surfaces, whereby the coupling sleeve 14 slides off the sleeve 13 under the influence of the axial component of the pressure as determined by the degree of taper.

Fig. 4 shows part of a built-up crankshaft, in which pins 16 and 17 are connected to a crank arm 18. The contacting surfaces of the pin 16 and arm 18 are tapering, and the joint will consequently become disengaged for a relatively short axial displacement between the pin and the crank arm. The tapering surface of the pin is somewhat shorter than the tapering surface in the crank arm and consequently the length of the surfaces in contact with each other will remain unchanged until the joint has separated, whereby it will be easier to retain the balance of pressure on both sides of the supply channel for the pressure medium. The supply channel 19 is arranged in the pin 16 in Fig. 4 and opens about at the center of the tapering surface of the pin. In the case of the pin 17, on the other hand, which is cylindrical, the supply channel 19a is arranged through the crank arm. The cylindrical hole of the crank arm is here provided with an inclined peripheral groove 20 near one side. This groove forms a lip 21, which effectively seals against the surface of the pin 17 under the influence of the pressure medium. The channel 19a can therefore in this case open in the neighbourhood of one end of the contacting surface, for instance into the groove 20, whereby the maintenance of an oil film between the contacting surfaces during the displacement of the pin will be possible during the whole separating operation. The pin can also be inserted with the assistance of an oil film formed according to the invention.

Fig. 5 shows a roller bearing 22 having a tapered hole mounted on a tapered shaft 23 provided with channels according to the invention.

In the form of the invention illustrated in Fig. 6 the coupling sleeve 24 is provided internally with a helical groove 25 which connects with the supply channel 26 for the pressure medium and terminates near the end of the sleeve in annular grooves 27. The groove 25 serves to distribute the pressure medium more quickly between the contacting surfaces. The left hand outer surface 28 of the coupling sleeve is tapered so that the thickness of the material at both ends of the sleeve is substantially the same whereby the pressure will be symmetrically distributed. The outer end edges of the sleeve 24 are bevelled at 29 to decrease the pressure at the ends of the sleeve. It will be noted that the coupling sleeve 24, like the sleeve 10 of Fig. 2, is provided with bevels at the ends of its inner surface so that the contacting or engaging surface of sleeve 24 will terminate some distance from the ends of said sleeve, in the same manner and for the same reasons fully explained above in connection with the construction shown in Fig. 2. The provision of bevels 29 results in the removal of a portion of the mass of material between the inner edges of the inner bevels and the adjacent outer ends of coupling sleeve 24, and thus decreases the amount of said mass and reduces the resistance to outward expansion of sleeve 24 by the pressure fluid.

Fig. 7 shows a demountable coupling flange 30, which is mounted on a shaft 31 by means of an externally tapering sleeve 32. The channel 33 is formed in the flange and opens toward the tapering sleeve 32 within the flange. The channel 33 thus opens nearest to that part of the coupling flange at which the material is thickest. In this manner it is insured that the pressure medium will reach the surfaces where the pressure is greatest.

Fig. 8 shows a roller bearing 34 mounted on a shaft 35 by means of an externally tapering sleeve 36, split at 37. The channel 38 is provided from the large end of the sleeve and communicates with a radially extending channel 39. A distributing groove 40 communicating with the last mentioned channel is provided at the inner surface of the sleeve. Since the surface of the sleeve is interrupted at 37, the groove 40 can not extend around the whole circumference of the sleeve but must terminate some distance from the cut 37. A pair of radial holes 41 connect with the groove 40. The pressure medium is in this manner distributed over both the inner and outer surfaces of the tapered sleeve, whereby the introduction and extraction of the sleeve are greatly facilitated.

The following example gives some indication of the advantages which may be attained through the use of the invention. A sleeve mounted with a press fit on a shaft having 100 mm. diameter required a force of 170 tons to shift the sleeve when there was metallic contact between the sleeve and the shaft. When oil had been forced between the surfaces, the force required for the purpose was only about 5 tons, or only about 3% of what was otherwise required. Tests which have been carried out show that oil that had been forced in between the surfaces had disappeared after a relatively short time and that the strength of the joint and its ability to transmit power had in no way been diminished.

The use of the invention is not limited to the cases described above. The invention can be applied almost universally, where heavy press and shrink seats are required. The invention can consequently be used for example for mounting and dismounting fly wheels or other wheels rigidly connected to a shaft.

Having thus described my invention, I claim and desire to secure by Letters Patent the following:

1. In a coupling for shaft ends, a coupling sleeve surrounding the said shaft ends, and a relatively thin annular member interposed between said sleeve and said shaft ends and covering the joint between said ends, there being a supply channel for fluid under pressure opening to the contacting surfaces of said sleeve and member through one of said surfaces.

2. In a coupling for shaft ends, a relatively thin inner sleeve surrounding the said shaft ends and an outer coupling sleeve surrounding the said inner sleeve with a press fit, the length of the said inner sleeve being about one and a half times the length of the coupling sleeve and said sleeves presenting to each other continuous substantially cylindrical contacting surfaces, there being a supply channel for fluid under pressure leading to the outer surface of said inner sleeve through the contacting surface of the outer sleeve.

3. In a coupling for shaft ends, a relatively thin inner sleeve surrounding the said shaft ends and having a tapering outer surface and an outer coupling sleeve surrounding the said inner sleeve and having an internal tapering surface fitting the external tapering surface of the inner sleeve with a press fit, there being a supply channel for fluid under pressure leading to the outer surface of the inner sleeve through the tapering surface of the outer sleeve.

4. A joint comprising an outer member and an inner member, the said members being fitted to each other with a press fit, one of said members having a supply channel for introducing a fluid under pressure between the engaging surfaces, said channel opening through one of said surfaces, and one of said members having bevels at the ends of its engaging surface, whereby, due to the mass of material existing between the inner edges of the said bevels and the adjacent outer ends of said last mentioned member, the pressure between the members at the ends of their engaging surfaces will be greater than along the intermediate part of said engaging surfaces when fluid under pressure is introduced therebetween.

5. A joint comprising an inner member, a contractible sleeve normally slidably fitted to said inner member, and an outer member embracing and having a force-fit with said sleeve contracting the latter into corresponding force-fit relation with the inner member, and a supply channel for fluid under pressure opening to the contacting surfaces of said sleeve and outer member.

6. A joint as defined in claim 4, wherein the member having the bevels at the ends of its engaging surface is also provided with bevels at its outer ends to decrease the mass of material existing between the inner edges of said first mentioned bevels and the adjacent ends of said member, whereby to decrease the pressure between the members at the ends of their engaging surfaces when fluid under pressure is introduced therebetween.

AXEL ERLAND BRATT.

REFERENCES CITED

The following references are of record in the file of this patent:

UNITED STATES PATENTS

| Number | Name | Date |
| --- | --- | --- |
| 441,170 | Kidder | Nov. 25, 1890 |
| 478,292 | Simcox | July 5, 1892 |
| 961,375 | Seabrook | June 14, 1910 |
| 1,065,069 | Noble | June 17, 1913 |
| 1,066,277 | Hunter et al. | July 1, 1913 |
| 1,843,463 | Tawresey | Feb. 2, 1932 |
| 2,081,431 | Hamer | May 25, 1937 |
| 2,082,379 | Brittain, Jr. | June 1, 1937 |
| 2,084,439 | Hamer | June 22, 1937 |
| 2,098,581 | Jones | Nov. 9, 1937 |

FOREIGN PATENTS

| Number | Country | Date |
| --- | --- | --- |
| 638,471 | France | Feb. 21, 1928 |
| 148,329 | Switzerland | July 15, 1931 |